US009700829B1

(12) United States Patent
Hunyadi Murph et al.

(10) Patent No.: US 9,700,829 B1
(45) Date of Patent: Jul. 11, 2017

(54) METHOD OF CAPTURING OR TRAPPING ZINC USING ZINC GETTER MATERIALS

(71) Applicant: Savannah River Nuclear Solutions, LLC, Aiken, SC (US)

(72) Inventors: Simona E. Hunyadi Murph, North Augusta, SC (US); Paul S. Korinko, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 0 days.

(21) Appl. No.: 15/056,699

(22) Filed: Feb. 29, 2016

(51) Int. Cl.
*B01D 53/04* (2006.01)
*B01J 20/02* (2006.01)
*B01J 20/28* (2006.01)

(52) U.S. Cl.
CPC ............ *B01D 53/04* (2013.01); *B01J 20/02* (2013.01); *B01J 20/28016* (2013.01); *B01D 2253/1122* (2013.01); *B01D 2253/304* (2013.01); *B01D 2257/60* (2013.01)

(58) Field of Classification Search
CPC ............ B01D 53/04; B01D 2253/1122; B01D 2253/304; B01D 2257/60; B01J 20/02; B01J 20/28016
USPC ............................................. 95/133; 977/903
See application file for complete search history.

(56) References Cited

U.S. PATENT DOCUMENTS

| 8,277,767 | B2 | 10/2012 | Ariya-Far | |
| 8,529,673 | B2 | 9/2013 | Chuntonov | |
| 8,900,420 | B2 | 12/2014 | Veeraraghavan et al. | |
| 8,956,443 | B2 | 2/2015 | Rohr et al. | |
| 2008/0081007 | A1 | 4/2008 | Steele et al. | |
| 2011/0053766 | A1* | 3/2011 | Hurt | B32B 1/02 502/401 |
| 2011/0294660 | A1 | 12/2011 | Koo et al. | |
| 2012/0045582 | A1* | 2/2012 | Gay | C23C 10/06 427/250 |
| 2014/0175334 | A1* | 6/2014 | Porcheron | B01J 20/0266 252/189 |

OTHER PUBLICATIONS

SRNL-STI-2011-00347, Effect of Pore Size on Trapping Zinc Vapors, Paul Korinko, Dec. 17, 2010.
SRNL-STI-2011-00349, Preliminary Study of Methods to Chemically Bind Zinc, Paul Korinko, Jun. 10, 2011.
SRNL-STI-2011-00472, Summary Report for Zinc 65 Contamination Control, Paul Korinko, Jul. 14, 2011.
SRNL-STI-2013-00625, Effect of Thermal Processes on Copper-Tin Alloys for Zinc Gettering, Golyski, et al., Oct. 8, 2013.
SRNL-STI-2014-00275, Development and Characterization of Nanomaterials for Zinc Vapor Capture, Korinko, et al., TMS 2015 144th Annual Meeting & Exhibition, Mar. 15-19, 2015, Orlando, FL.
Sensitive Detection of $H_2S$ Using Gold Nanoparticles Decorated SWNTs, Mubeen, et al., Analytical Chemistry, Jan. 1, 2010, 82(1): 250-257.

(Continued)

*Primary Examiner* — Frank Lawrence
(74) *Attorney, Agent, or Firm* — Dority & Manning, P.A.

(57) ABSTRACT

A method of trapping or capturing zinc is disclosed. In particular, the method comprises a step of contacting a zinc vapor with a zinc getter material. The zinc getter material comprises nanoparticles and a metal substrate.

23 Claims, 11 Drawing Sheets

(56) References Cited

OTHER PUBLICATIONS

Effect of Thermal Processes on Copper-Tin Alloys for Zinc Gettering, Korinko, et al., Nov. 1, 2013.
New Systems for Waste Processing of Tritium-Containing Gasses at the Savannah River Site, Poore, et al., Fusion Science and Technology 48.1: 298-301, Jul. 15, 2005.
Chemical Reviews 2012, Gold Nanoparticles in Chemical and Biological Sensing, Saha, et al., Feb. 2, 2012, 112(5), pp. 2739-2779.

* cited by examiner

Au Nanoparticles on SSW
(after Zn exposure)

Au Nanoparticles on SSW
(after Zn exposure and
sonicated for 30 minutes)

Au Nanoparticles on SSW
(after Zn exposure and
sonicated for 60 minutes)

METHOD OF CAPTURING OR TRAPPING ZINC USING ZINC GETTER MATERIALS

FEDERAL RESEARCH STATEMENT

This invention was made with Government support under Contract No. DE-AC09-085R22470, awarded by the U.S. Department of Energy. The Government has certain rights in the invention.

BACKGROUND OF THE INVENTION

The ability to effectively and efficiently capture zinc vapors is of importance. For instance, radioactive zinc can be detected from extracted tritium-producing burnable absorber rods that have been irradiated. Thus, in order to prevent radioactive contamination, it is desired to capture and trap the zinc.

Various physical and chemical methods of trapping and retaining zinc vapors have been employed. However, in certain instances, these methods employ materials which may not be suitable for use at high temperatures. In particular, these materials may not exhibit the necessary thermal stability when employed at high temperatures. As a result, they may not be as effective for trapping zinc vapors.

As a result, there is a need to provide an efficient method of trapping zinc vapors. In particular, there is a need to provide an efficient method by employing zinc getter materials that are suitable for use at high temperatures.

SUMMARY OF THE INVENTION

Aspects and advantages of the invention will be set forth in part in the following description, or may be apparent from the description, or may be learned through practice of the invention.

In accordance with one embodiment of the present invention, a method of capturing or trapping zinc is disclosed. In particular, the method comprises a step of contacting a zinc vapor with a zinc getter material. The zinc getter material comprises nanoparticles and a metal substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
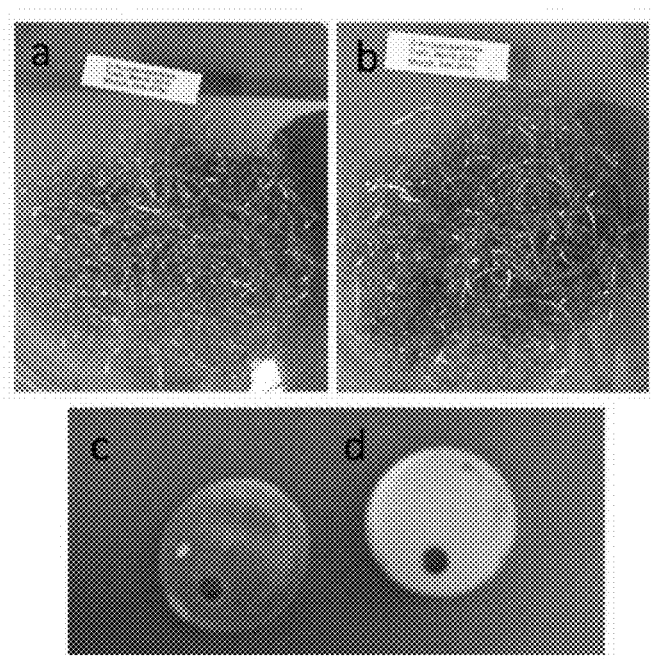
FIG. 1 provides images of nanoparticle treated stainless steel wool and untreated bronze pellets before and after zinc vapor exposure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present invention is directed to a method of capturing or trapping zinc, such as zinc vapor. In particular, the method comprises a step of contacting zinc vapor with a zinc getter material. For instance, the zinc getter material can comprise a nanoparticle and a metal substrate. The present inventors have discovered that the method and zinc getter materials disclosed herein are effective for trapping zinc vapor.

As mentioned herein, the present invention is directed to trapping or capturing zinc, such as zinc vapor. The zinc may be an isotope of zinc. For instance, in one embodiment, the zinc may be a radioisotope of zinc. In one particular embodiment, the zinc may be zinc-65. In one embodiment, the zinc may be attributed to or produced from a high vacuum thermal deposition process and/or apparatus.

As mentioned herein, the present invention employs a zinc getter material containing a nanoparticle and a metal substrate for trapping or capturing the zinc. The present inventors have discovered that these materials are effective for such purpose. In particular, the present inventors have found that the nanoparticles can exhibit unique properties due to their large surface area and quantum size effects.

According to the present invention, the zinc getter material contains a metal substrate. The metal substrate may include any metal known in the art. The metal substrate may comprise at least one metal. For instance, in one embodiment, the metal substrate may comprise at least two metals. For instance, the metal substrate may be an alloy. In one embodiment, the metal substrate may include copper, tin, chromium, or a combination thereof. In one embodiment, the metal substrate may include copper. In one particular embodiment, the metal substrate may include copper and tin.

Thus, in one embodiment, the metal substrate may include bronze. In another embodiment, the metal substrate may include chromium. For instance, the metal substrate may include stainless steel. In addition, it should be understood that the metal substrate may consist essentially of or consist of the aforementioned metals.

In general, the metal substrate may be provided having any configuration known in the art. In general, the metal substrate should be one that allows for the adhesion, deposition, and/or nucleation of the nanoparticles disclosed herein. For instance, the metal substrate may be in the form of a coupon, wool, a screen, a rod, etc. For instance, the metal substrate may include, but is not limited to, a copper coupon, a bronze coupon, a stainless steel coupon, stainless steel wool, etc.

In one embodiment, the metal substrate includes more than 50 wt. % metal, such as 75 wt. % or more, such as 90 wt. % or more, such as 95 wt. % or more, such as 99 wt. % or more, such as 99.9 wt. % or more, such as 99.99 wt. % or more. In one embodiment, the metal substrate consists essentially of or consists of a metal.

According to the present invention, the zinc getter material contains a nanoparticle. According to the present invention, the nanoparticle includes a metal. In general, it should be understood that any metal capable of being provided as a nanoparticle and performing as a zinc getter material may be employed according to the present disclosure. For instance, the nanoparticle may comprise gold, cobalt, or a combination thereof. For instance, in one embodiment, the nanoparticle may comprise gold. In another embodiment, the nanoparticle may comprise cobalt. In a further embodiment, the nanoparticle may comprise both gold and cobalt. For instance, in one embodiment, the nanoparticle may comprise a gold/cobalt alloy. In addition, it should be understood that the nanoparticles may consist essentially of or consist of the aforementioned metals.

In addition, the nanoparticle may be in the form of any shape or configuration known in the art. For instance, the nanoparticles may be made of two different metals and may have a core-shell configuration. The weight ratio of the core to the shell can be 1:1 or more, such as 10:1 or more, such as 25:1 or more, such as 40:1 or more, such as 50:1 or more and 250:1 or less, such as 150:1 or less, such as 100:1 or less, such as 90:1 or less, such as 80:1 or less, such as 75:1 or less. In one embodiment, the weight ratio may be from 50:1 to 75:1.

In one embodiment, the nanoparticle may comprise both gold and cobalt in a core-shell configuration. For instance, the core may include gold while the shell may include cobalt or alternatively the core may include cobalt while the shell may include gold. In one embodiment, the weight ratio of the core, whether gold or cobalt, to the shell, comprising the other of gold or cobalt, can be 1:1 or more, such as 10:1 or more, such as 25:1 or more, such as 40:1 or more, such as 50:1 or more and 250:1 or less, such as 150:1 or less, such as 100:1 or less, such as 90:1 or less, such as 80:1 or less, such as 75:1 or less. In one embodiment, the weight ratio may be from 50:1 to 75:1. In one embodiment, the core includes gold while the shell includes cobalt having the aforementioned weight ratios.

In another embodiment, the core may include a gold/cobalt alloy while the shell may be made of either gold or cobalt or alternatively the core may be made of either gold or cobalt while the shell may be a gold/cobalt alloy. In one embodiment, the weight ratio of the gold to the cobalt in the alloy can be from 10:1 or less, such as 5:1 or less, such as 2.5:1 or less, such as 1.5:1 or less, such 1:25 or less to 1:10 or more, such as 1:5 or more, such as 1:3 or more, such as 1:2 or more, such as 2:3 or more, such as 3:4 or more, such as 4:5 or more. In one embodiment, the weight ratio of the gold to the cobalt in the alloy is about 1:1. In addition, the aforementioned core to shell weight ratios may apply.

The nanoparticles can be produced utilizing any method generally known in the art. Such methods include, but are not limited to, wet chemistry approaches, reduction methods, nanolithography, physical vapor deposition, electrochemical approaches, sputtering, etc. For instance, in one embodiment, the nanoparticles can be produced using a reduction method. For instance, aqueous solutions containing the desired metal can be boiled and reduced (e.g., citrate reduction) to obtain the desired nanoparticles.

As mentioned herein, the zinc getter material includes a nanoparticle and a metal substrate. In one embodiment, the nanoparticles are present on the surface of the metal substrate. Without intending to be limited by theory, the nanoparticles can provide an increased surface area for capturing or trapping the zinc.

The nanoparticles can be deposited, adhered, grown, etc. onto the metal substrate. Any method may be employed so long as the nanoparticles are capable of being provided and retained by the metal substrate. For instance, various methods such as electrodeposition, vapor deposition, precipitation, etc. can be employed for providing nanoparticles on the metal substrate.

In one embodiment, the nanoparticles can first be synthesized and thereafter deposited or adhered onto the metal substrate. In this regard, they can be deposited or adhered onto the metal substrate using any method known in the art.

In another embodiment, a nucleation and growth approach may be utilized. For instance, the nanoparticles can be grown onto the surface of the metal substrate. In this regard, the nanoparticles can be grown onto the substrates using any method generally known in the art. Without intending to be limited by theory, nucleation and growth includes a step of creating nuclei wherein such nuclei serve as templates for growth.

In one embodiment, the nanoparticles can be grown on the metal substrate using an aqueous solution and employing conditions for producing the desired deposit size and shape onto the metal substrate. For instance, the nanoparticles can be synthesized in the presence of the metal substrate so that the nanoparticles are grown onto the substrate. For instance, the nanoparticles can grow and/or attach onto the substrate via nucleation and growth of the crystal on the substrate.

In general, the nanoparticles can be in the form of discrete particles or aggregates on the metal substrate. Thus, before exposure to zinc vapor, the nanoparticles may have an average particle size of 5 nm or greater, such as 10 nm or greater, such as 15 nm or greater, such as 20 nm or greater and 800 nm or less, such as 600 nm or less, such as 500 nm or less, such as 400 nm or less, such as 300 nm or less, such as 200 nm or less, such as 150 nm or less, such as 100 nm or less, such as 50 nm or less. The average particle size can be determined by analyzing the particle sizes from a micrograph obtained using a microscopy technique, such as via scanning electron microscopy.

In one embodiment, before zinc exposure, the nanoparticles on the metal substrate may have a multimodal (e.g., bimodal, trimodal, etc.) size distribution. For instance, a first size distribution, such as nanoparticles in the form of discrete particles may have an average particle size of 2 nm or greater, such as 5 nm or greater, such as 10 nm or greater, such as 15 nm or greater, such as 20 nm or greater and 50 nm or less, such as 45 nm or less, such as 40 nm or less, such as 35 nm or less, such as 30 nm or less. Meanwhile, a second distribution, such as nanoparticles in the form of aggregates, may have an average size of greater than 50 nm, such as 55 nm or greater, such as 60 nm or greater, such as 65 nm or greater, such as 70 nm or greater, such as 75 nm or greater and 150 nm or less, such as 130 nm or less, such as 125 nm or less, such as 100 nm or less, such as 90 nm or less, such as 85 nm or less. In one embodiment, a third distribution may also be present having an average size of greater than 150 nm, such as 175 nm or more, such as 200 nm or more to 500 nm or less, such as 400 nm or less, such as 300 nm or less, such as 250 nm or less. Any method known in the art for determining whether the particles have a multimodal size distribution can be employed.

By depositing, adhering, or growing the nanoparticles on the metal substrate, the nanoparticles may occupy the surface area of the metal substrate. In general, the nanoparticles occupy 5% or more, such as 10% or more, such as 15% or more, such as 20% or more, such as 25% or more, such as 30% or more, such as 40% more, such as 50% or more and 90% or less, such as 80% or less, such as 70% or less, such as 60% or less, such as 50% or less, such as 40% or less, such as 30% or less of the surface area of the metal substrate. In one embodiment, the nanoparticles occupy only such percentages of one side or surface of a metal substrate.

According to the method disclosed herein, the zinc getter materials, in particular the nanoparticles, are capable of trapping or capturing the zinc, such as the zinc vapors. For instance, the zinc getter materials can be exposed to or contacted with zinc vapor for capturing or trapping the same.

Without intending to be limited by theory, it is believed that the zinc alloys with the metal(s) of the nanoparticle and thus the nanoparticle is able to capture or trap the zinc. Without intending to be limited by theory, it is believed that the zinc forms a metallic bond with the metal(s) of the nanoparticle. Such alloying can form an intermetallic compound that can be confirmed by high resolution transmission electron microscopy (HRTEM) and/or X-ray diffraction (XRD). Without intending to be limited by theory, such alloying may provide additional stability and irreversibility of the materials upon exposure to zinc vapor. In addition, the zinc may also be capable of depositing or adhering onto the metal substrate.

In one embodiment, the zinc getter materials presently disclosed may be able to trap the zinc vapor in a chemical form while avoiding the formation of a hydride. In one embodiment, the zinc getter materials disclosed herein may be capable of trapping or capturing zinc without also acting as hydrogen getters. In addition, the method and materials presently disclosed may also be employed and prevent or reduce the formation of various gases such as $CH_4$, $NH_3$, $H_2S$, etc.

The method presented herein may be conducted at any temperature in which zinc vapors can be present and are capable of being captured/trapped or deposited onto the zinc getter materials. In one embodiment, the method may be conducted at a temperature of from about 150° C. to about 500° C., such as from about 250° C. to about 450° C., such as from about 300° C. to about 400° C., such as from about 325° C. to about 375° C.

The present inventors have discovered that the method and zinc getter materials disclosed herein are effective for capturing and trapping zinc vapors. For instance, upon exposure to zinc vapor, the nanoparticles may increase in size. Thus, after exposure to zinc vapor, the nanoparticles may have an average particle size of 5 nm or greater, such as 10 nm or greater, such as 15 nm or greater, such as 20 nm or greater and 800 nm or less, such as 600 nm or less, such as 500 nm or less, such as 400 nm or less, such as 300 nm or less, such as 200 nm or less, such as 150 nm or less, such as 100 nm or less, such as 50 nm or less. The average particle size can be determined by analyzing the particle sizes from a micrograph obtained using a microscopy technique, such as via scanning electron microscopy.

In addition, after zinc exposure, the nanoparticles on the metal substrate may also have a multimodal (e.g., bimodal, trimodal, etc.) size distribution. For instance, the first distribution referenced herein, such as nanoparticles in the form of discrete particles may experience an increase in the average particle size of about 5% or more, such as 10% or more, such as 15% or more, such as 25% or more, such as 30% or more, such as 40% or more and 300% or less, such as 200% or less, such as 100% or less, such as 90% or less, such as 80% or less, such as 70% or less, such as 60% or less, such as 50% or less, such as 40% or less. Such particles of the first distribution may have an average particle size of 2 nm or greater, such as 5 nm or greater, such as 10 nm or greater, such as 15 nm or greater, such as 20 nm or greater, such as 30 nm or greater and 75 nm or less, such as 65 nm or less, such as 50 nm or less, such as 45 nm or less, such as 40 nm or less, such as 35 nm or less, such as 30 nm or less, such as 25 nm or less.

Meanwhile, the second distribution referenced herein, such as nanoparticles in the form of aggregates, may experience an increase in the average particle size of about 1% or more, such as 5% or more, such as 10% or more, such as 15% or more, such as 25% or more, such as 30% or more, such as 40% or more and 300% or less, such as 200% or less, such as 100% or less, such as 90% or less, such as 80% or less, such as 70% or less, such as 60% or less, such as 50% or less, such as 40% or less. Such particles of the second distribution may have an average size of greater than 50 nm, such as 55 nm or greater, such as 60 nm or greater, such as 65 nm or greater, such as 70 nm or greater, such as 75 nm or greater and 175 or less, such as 150 nm or less, such as 130 nm or less, such as 125 nm or less, such as 100 nm or less, such as 90 nm or less, such as 85 nm or less.

In one embodiment, a third distribution may also be present having an average size of greater than 150 nm, such as 175 nm or more, such as 200 nm or more, such as 300 nm or more to 500 nm or less, such as 400 nm or less, such as 300 nm or less, such as 250 nm or less. Any method known in the art for determining whether the particles have a multimodal size distribution can be employed.

In one embodiment, when viewed under SEM or TEM, at least some of the zinc may be present having a cubic (or isometric) morphology.

In addition, after capturing or trapping zinc, at least some of the nanoparticles containing the zinc may have sizes of 200 nm or more, such as 250 nm or more, such 300 nm or more, such as 350 nm or more, and 800 nm or less, such as 700 nm or less, such as 600 nm or less, such as 500 nm or less, such as 400 nm or less.

In this regard, the weight of the zinc getter materials can also be increased after exposure to zinc. For instance, the weight of the zinc getter materials can increase by 0.01 wt. % or more, such as 0.1 wt. % or more, such as 0.2 wt. % or more, such as 0.5 wt. % or more, such as 1 wt. % or more, such as 5 wt. % or more, such as 10 wt. % or more to 200 wt. % or less, such as 100 wt. % or less, such as 50 wt. % or less, such as 25 wt. % or less, such as 15 wt. % or less, such as 10 wt. % or less, such as 5 wt. % or less, such as 2 wt. % or less, such as 1.5 wt. % or less, such as 1 wt. % or less. In one embodiment, the zinc can be present in an amount such that it saturates the nanoparticles.

In general, based on the amount of gold in the nanoparticle, the weight ratio of zinc to that of the gold may be from 0.01 or more, such as 0.1 or more, such as 0.2 or more, such as 0.3 or more, such as 0.4 or more, such as 0.5 or more, such as 0.6 or more, such as 0.7 or more, such as 0.8 or more, such as 1 or more to 50 or less, such as 25 or less, such as 10 or less, such as 5 or less, such as 4 or less, such as 3 or less, such as 2.5 or less, such as 2 or less, such as 1.5 or less, such as 1 or less, In general, based on the amount of cobalt in the nanoparticle, the weight ratio of zinc to that of the cobalt may be from 0.5 or more, such as 1 or more, such as 5 or more, such as 10 or more, such as 15 or more, such as 20 or more, such as 25 or more, such as 30 or more, such as 40 or more, such as 45 or more to 100 or less, such as 90 or less, such as 80 or less, such as 70 or less, such as 60 or less, such as 50 or less, such as 40 or less, such as 30 or less, such as 20 or less.

In one embodiment, the zinc may be released from the zinc getter materials. For instance, the zinc may be removed from the materials by exposing the materials to sonication. Sonication may also be used to evaluate the zinc retention and the adhesion of the zinc to the materials. Other dezincification methods include vacuum extraction at high temperatures and low pressures, corrosion, etc. When present in solution, the solution and zinc can thereafter be further processed as desired and necessary. It should be understood that other methods may also be employed for removing the zinc.

The method and materials disclosed herein can have a number of applications. For instance, the method can be used to trap zinc, such as zinc-65, that is detected from irradiated tritium-producing burnable absorber rods (TP-BARs). For instance, the method may be conducted during a vacuum processing step. In this instance, the zinc-65 may be an activation product of natural zinc. In general, the zinc-65 extracted may produce a signature greater than the background.

The present inventors have discovered that when the nanoparticles are deposited onto the metal substrate, the zinc getter materials can effectively and efficiently capture zinc. Without intending to be limited by theory, it is believed that the nanoparticles can be bound to the substrate and handled safely such that the metal substrate serves as an efficient active anchoring site so that the nanoparticles can be exposed to the zinc vapors. This can allow for an easier deployment and can be used to retain the zinc vapor and/or gamma emitting materials in the high radiations areas safely. As a result, this may also reduce personnel exposure, prevent product contamination, and reduce disposal cost.

EXAMPLES

Example 1—Synthesis of Materials

Materials of various size, shape, morphologies and compositions were grown onto different substrate materials, including copper coupon (CC), bronze coupon (BC), stainless steel coupons (SSC) and stainless steel wool (SSW). Nanoparticles of interest, including Au, Co, Au—Co core-shell (CS), Au—Co alloy (A), and Au—Co—Co alloy-core-shell (ACC), were grown from aqueous solutions using conditions that would produce the desired deposit size and shape.

Gold and cobalt nanoparticles were prepared by a citrate reduction approach in the presence of supports, SSW, CC, SSC and BC.

Gold nanoparticles were synthesized by heating an aqueous solution having $1.25 \times 10^{-4}$ M $Au^{3+}$ to boiling and adding a 1 wt. % reducing agent (sodium citrate) solution. The boiling was continued until the solution turned ruby red, indicating the formation of gold nanoparticles.

Cobalt nanoparticles were synthesized by heating an aqueous solution having $1.25 \times 10^{-4}$ M $Co^{2+}$ to boiling and adding a 1 wt. % reducing agent (sodium citrate) solution. The boiling was continued until the solution turned light yellow, indicating the formation of cobalt nanoparticles.

Gold/cobalt alloy nanoparticles were prepared by a similar procedure by reducing a mixture of $1.25 \times 10^{-4}$ M $Au^{3+}$ and $1.25 \times 10^{-4}$ M $Co^{2+}$, with a color change to light blue indicating the deposition of the alloy particles.

Core-shell Au—Co nanoparticles were prepared in two steps: (a) synthesis of Au (0) nanosphere core seeds and (b) Co shell. Gold nanoparticles were synthesized by heating an aqueous solution having $1.25 \times 10^{-4}$ M $Au^{3+}$ to boiling and adding a 1 wt. % reducing agent (sodium citrate) solution. The boiling was continued until the solution turned ruby red, indicating the formation of gold nanoparticles. The Co shell was added to these Au "seed" particles by adding $1.25 \times 10^{-4}$ M $Co^{2+}$ to boiling and adding a 1 wt. % reducing agent (sodium citrate) solution.

Au—Co—Co alloy-core-shell nanoparticles were prepared in two steps: (a) preparation of the Au—Co alloy nanospheres and (b) preparation of the Au—Co alloy coated with Co. Gold/cobalt alloy nanoparticles were prepared by a similar procedure by reducing a mixture of $1.25 \times 10^{-4}$ M $Au^{3+}$ and $1.25 \times 10^{-4}$ M $Co^{2+}$, with a color change to light blue indicating the deposition of the alloy particles. The as prepared Au—Co alloy nanospheres prepared were used as "seeds" for addition of a Co shell. To this "seed" solution, $1.25 \times 10^{-4}$ M $Co^{2+}$ was added to boiling followed by adding a 1 wt. % reducing agent (sodium citrate) solution.

The resulting nanoparticles were purified by three to five washings in deionized water.

Example 2—Zinc Capturing/Trapping

Samples of Au, Co, and Au—Co deposited on stainless steel wool (SSW), stainless steel coupons (SSC), copper coupons (CC), and bronze coupons (BC) were exposed to zinc vapor from a zinc source at a temperature of 350° C. and a material containing the nanoparticles at a temperature of 350° C. sing a high vacuum thermal deposition apparatus. Samples were exposed to zinc vapor from a high vacuum thermal deposition apparatus. The zinc vaporization and filter temperature conditions were 350° C. and an initial vacuum pressure of at least $5 \times 10^{-6}$ Torr.

FIG. 1 provides images of the nanoparticle treated SSW before (a) and after (b) exposure to zinc vapor. FIG. 1 also provides images of the untreated bronze pellets before (c) and after (d) zinc exposure.

Visual examination indicates that nanoparticle treated SSW exposed to zinc vapor did not reveal any change in color, unlike the bronze pellets (initially orange/bronze and then a golden tint/brass after zinc alloying).

Figure 2:
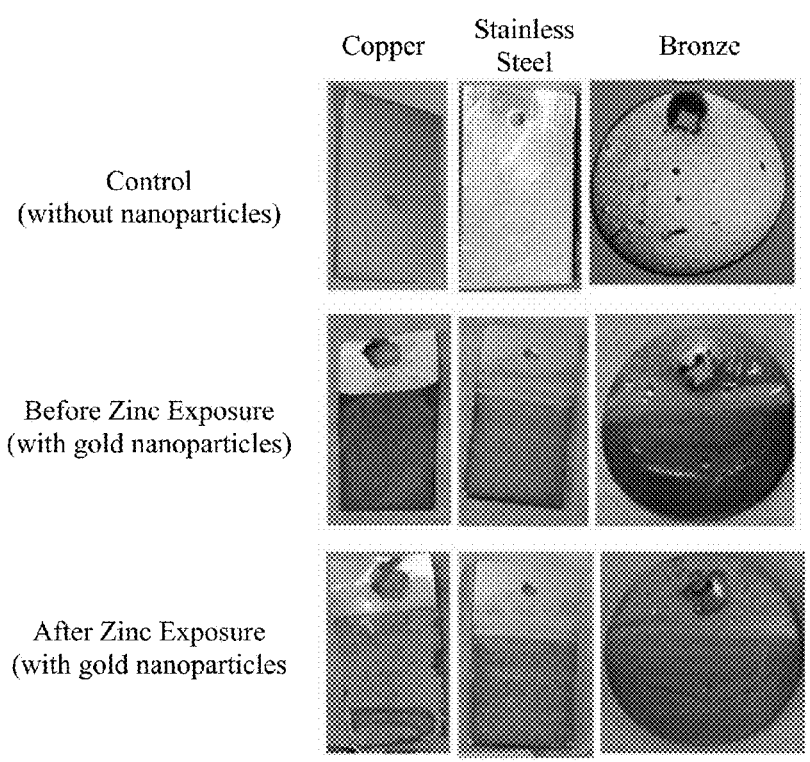
FIG. 2 provides images of copper, stainless steel, and bronze coupons before nanoparticle treatment and nanoparticle treated coupons before and after zinc exposure.

As illustrated in FIG. 2, visual examination of the copper coupons, stainless steel coupons, and bronze coupons shows a significant color change after gold nanoparticle deposition and exposure to zinc vapor. The first row of FIG. 2 provides images of the substrates without nanoparticle deposition. The second row of FIG. 2 provides images of the substrates with gold nanoparticle deposits but before exposure to zinc vapor. The third row of FIG. 2 provides images of the substrates with gold nanoparticle deposits and after exposure to zinc vapor.

All samples were examined using Scanning Electron Microscopy (SEM) and Energy Dispersive X-Ray Spectroscopy (EDX). The examples were analyzed to evaluate the effectiveness of the materials as zinc getters.

Figure 3:
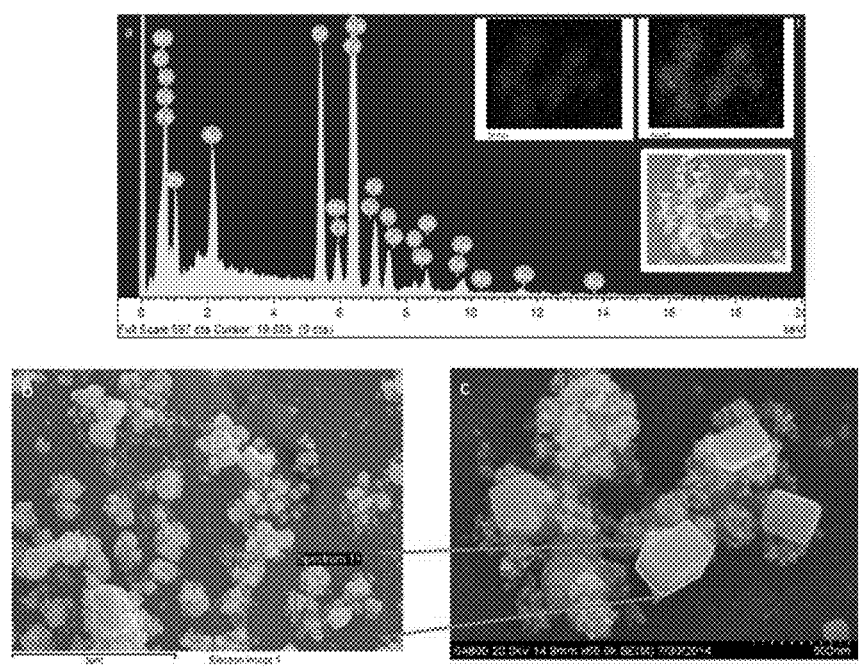
FIG. 3 provides an EDX mapping analysis of gold nanoparticles deposited onto stainless steel wool after zinc vapor exposure and SEM images of the zinc deposits trapped by the gold nanoparticles.

Semi-quantitative analysis was conducted on the sample as well as X-ray mapping (FIG. 3). In particular, FIG. 3a shows an EDX mapping analysis of gold nanoparticles deposited onto stainless steel wool after zinc deposition. FIGS. 3b and 3c provide SEM images showing zinc deposits on the gold nanoparticles.

EDX microanalysis of Au, Au—Co and Co nanoparticles before and after Zn exposure was performed to evaluate nanoparticle composition of mono and bimetallic colloids (FIG. 3a). The EDX mapping analysis demonstrates the location of the elements of interest: Au, Co, and Zn. The chemical analyses for the zinc exposed samples are listed in Table 1.

Figure 7:
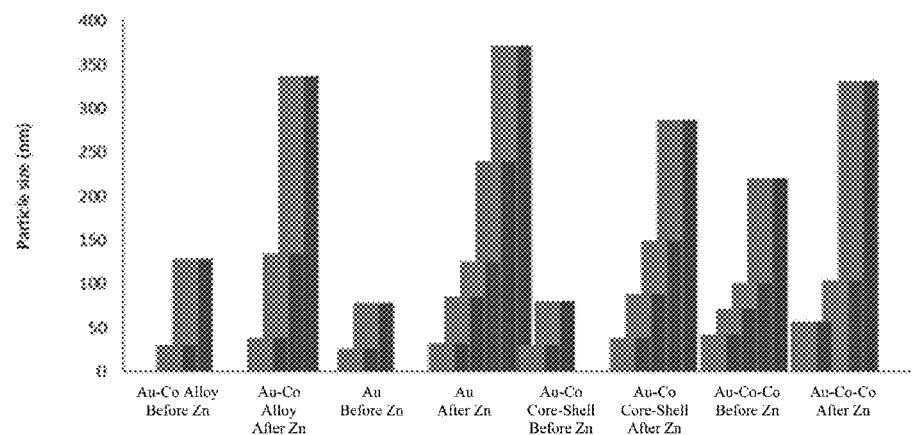
FIG. 7 provides an analysis of the particle size of the nanoparticles before and after zinc vapor exposure.

The deposits that appear to have increased in size incrementally with the relative size changes are shown in FIG. 7. In particular, FIG. 7 shows the nanoparticle sizes before zinc deposition and after zinc deposition. For the Au—Co alloys before zinc exposure, discrete particles having an average size of around 30 nm and nanoparticle clusters having an average size of around 128 nm were observed. After zinc exposure, the nanoparticles increased in size. For instance, the average of the nanoparticles was approximately 38 nm, while nanoparticle clusters had a bimodal distribution (e.g., average sizes of 134 nm and 336 nm). The results are indicated in Table 2.

TABLE 2

Average Sizes Before and After Zinc Exposure

| Nanoparticle | Distribution | Average Size Before Zinc Exposure (nm) | Average Size After Zinc Exposure (nm) |
|---|---|---|---|
| Au—Co | $1^{st}$ | 30 | 38 |
|  | $2^{nd}$ | 128 | 134 |
|  | $3^{rd}$ | — | 336 |

TABLE 1

Composition of Deposits Based on Semi-Quantitative X-ray Energy Dispersion Analysis.

| | ID | | | | | | | |
|---|---|---|---|---|---|---|---|---|
| Element | #0 Wt % | #1 Wt % | #2 Wt % | #3 Wt % | #3 Wt % | #4 Wt % | #5 Wt % | #5 Wt % |
| C K | 10.98 | 11.16 | 24.62 | 5.53 | 56.03 | 4.55 | 14.75 | 53.57 |
| O K | NM | 2.85 | 4.01 | 0.89 | 5.01 | NM | 2.29 | 7.73 |
| Al K | NM | 0.36 | NM | 0.18 | 0.17 | 0.3 | 45.31 | NM |
| Cr K | 16.25 | 11.84 | 12.11 | 15.81 | 5.13 | 17.07 | 4.58 | 6.34 |
| Mn K | NM | 3.71 | NM | 1.05 | NM | 0.95 | 0.68 | NM |
| Fe K | 66.01 | 49.97 | 40.44 | 58.4 | 18.33 | 62.76 | 16.69 | 21.5 |
| Co K | NM | NM | NM | 0.04 | 0.07 | 0.33 | 0.08 | 0.01 |
| Ni K | 6.76 | 7.6 | 5.52 | 9.53 | 2.85 | 9.11 | 2.56 | 2.96 |
| Zn L | NM | 5.74 | 7.22 | 5.79 | 5.71 | 2.49 | 3.51 | 3.51 |
| Au M | NM | 6.77 | 6.08 | 2.78 | 6.71 | NM | 5.96 | 4.39 |
| Mo L | NM | NM | NM | NM | NM | 2.17 | NM | NM |
| Si K | NM | NM | NM | NM | NM | 0.27 | NM | NM |
| Cu L | NM | NM | NM | NM | NM | NM | 3.58 | NM |
| Totals | 100 | 100 | 100 | 100 | 100 | 100 | 100 | 100 |

Figure 4:
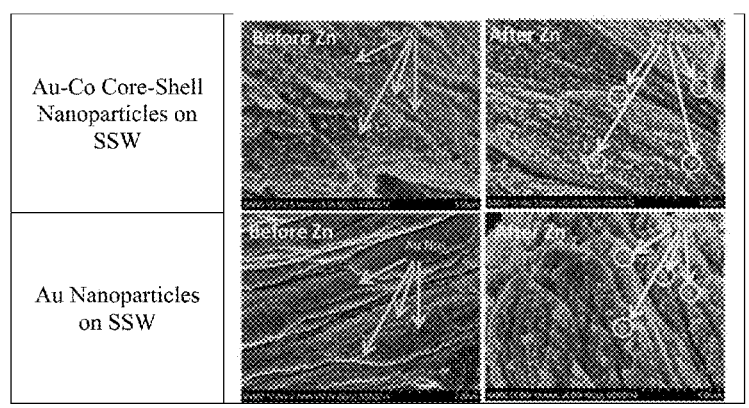
FIG. 4 provides SEM images before and after zinc vapor exposure of nanoparticles deposited on stainless steel wool.
Figure 5:
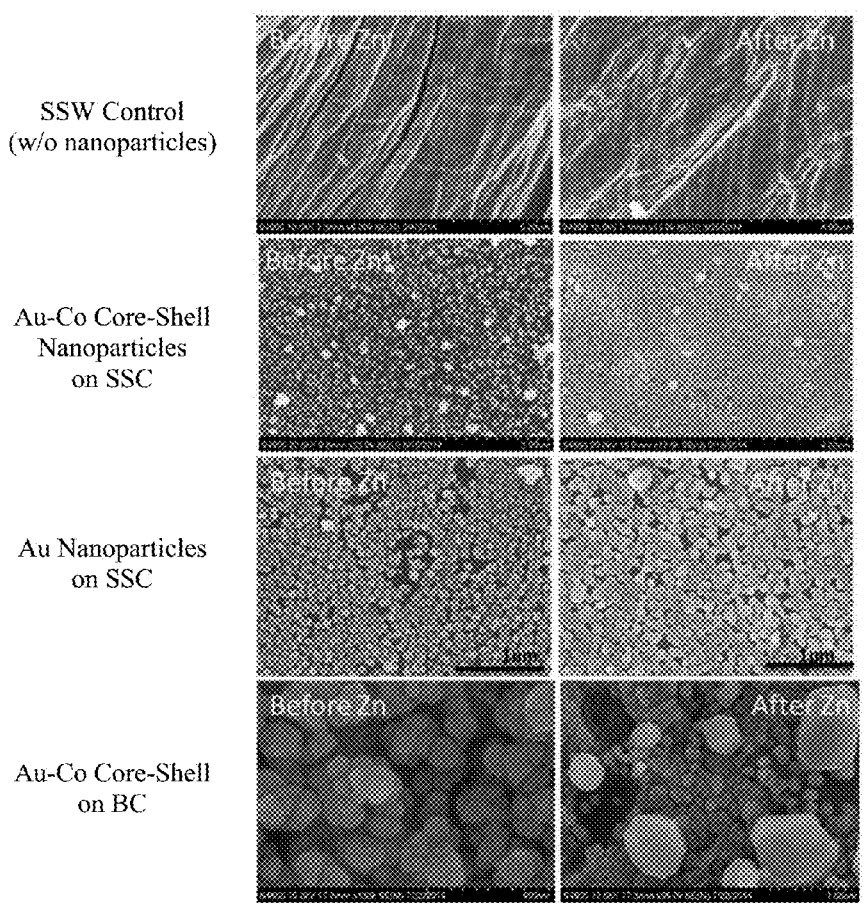
FIG. 5 provides SEM images before and after zinc vapor exposure of a stainless steel wool control and substrates containing gold-based and/or cobalt-based nanoparticles.
Figure 6:
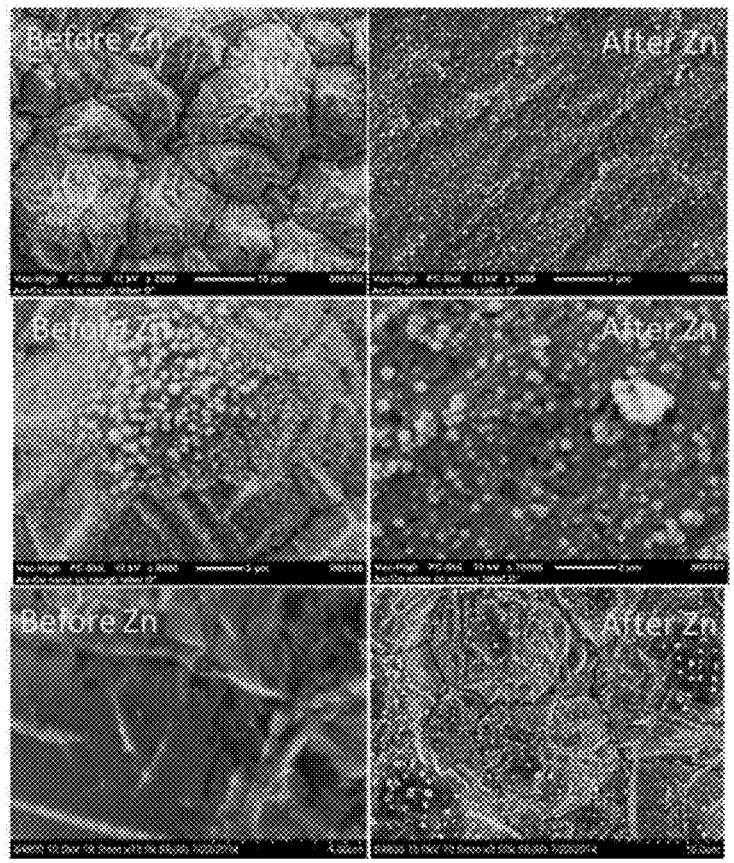
FIG. 6 provides SEM images before and after zinc vapor exposure of substrates containing gold-based and/or cobalt-based nanoparticles.

0 Control SSW; #1 Au-Co alloy; #2 Au; #3 Au-Co Coreshell; #4 Co CT; #5 Au-Co Co coreshell As shown in FIGS. 4, 5, and 6, the SEM analysis shows that nanoparticle treated SSW materials are effective Zn getter materials. FIG. 4 provides SEM images of nanoparticles deposited onto stainless steel wool before and after zinc vapor exposure. FIG. 5 provides SEM images of nanoparticles deposited onto various substrates before and after zinc vapor exposure. The first row of FIG. 5 provides images of stainless steel wool without nanoparticles. FIG. 6 also provides SEM images of nanoparticles deposited onto various substrates before and after zinc vapor exposure.

In addition, the zinc deposits could be easily observed on samples exposed to zinc vapor. Larger scale nanoparticles and microscale zinc particulates were detected. After zinc exposure, substrates modified with nanoparticles show nanoparticle sintering effects because these experiments were conducted at high temperatures. Sintering may be beneficial due to the increased adhesion properties which may keep the zinc deposits attached to the substrates. Film-like nanodeposits were also observed. Without intending to be limited by theory, it is believed that during the deposition process zinc is (a) captured as an alloy when seized or trapped by nanoparticles and (b) forms individual large zinc rectangular structures.

TABLE 2-continued

Average Sizes Before and After Zinc Exposure

| Nanoparticle | Distribution | Average Size Before Zinc Exposure (nm) | Average Size After Zinc Exposure (nm) |
|---|---|---|---|
| Au | $1^{st}$ | 26 | 32 |
|  | $2^{nd}$ | 78 | 85 |
|  | $3^{rd}$ | — | 125 |
|  | $4^{th}$ | — | 239 |
|  | $5^{th}$ | — | 371 |
| Au—Co Core-Shell | $1^{st}$ | 30 | 38 |
|  | $2^{nd}$ | 80 | 88 |
|  | $3^{rd}$ | — | 149 |
|  | $4^{th}$ | — | 286 |
| Au—Co—Co Core-Shell | $1^{st}$ | 42 | 57 |
|  | $2^{nd}$ | 71 | — |
|  | $3^{rd}$ | 101 | 104 |
|  | $4^{th}$ | 220 | 331 |

Figure 8:
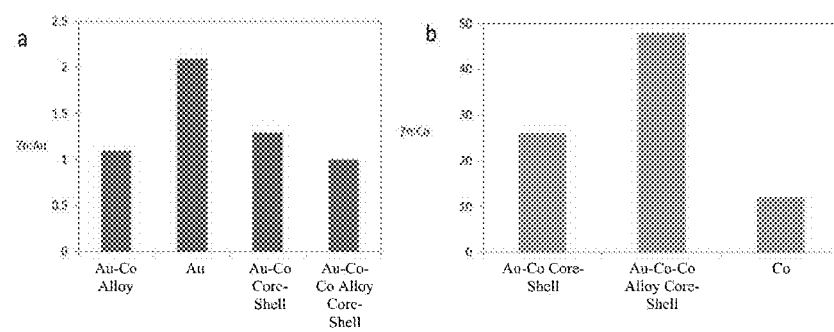
FIG. 8 provides data from an EDX analysis indicating the zinc content on the materials.

When analyzed by EDX, it was determined that gold nanoparticles on stainless steel wool were better zinc getters followed by Au—Co core-shell, Au—Co alloy, and Au—Co—Co alloy/core/shell (FIG. 8a). When using cobalt based nanoparticles on stainless steel wool, it was determined that the Au—Co—Co alloy/core/shell nanoparticles were better zinc getters followed by Au—Co core-shell and Co nanoparticles (FIG. 8b).

When nanoparticles were deposited onto substrates and evaluated as zinc getters, a mass increase was recorded (measured on an analytical scale balance), demonstrating once again that the materials and nanoparticles are effective zinc getter materials. This increase in mass is indicated in Table 2

TABLE 3

Mass Change After Zinc Vapor Exposure.

| Sample Ref | Sample | Change in Mass from Before and After Zinc Exposure (mg) |
| --- | --- | --- |
| A1 | Au ssc | 0.2 |
| A2 | Au ssc | ~0 |
| A3 | Au ssc | 0.1 |
| A4 | Au ssc | ~0 |
| B1 | Au—Co ssc | 0.1 |
| B2 | Au—Co ssc | 0.1 |
| B3 | Au—Co ssc | 0.1 |
| B4 | Au—Co ssc | 0.1 |
| F | Au—Co ssc (10 min) | 0.3 |
| F | Au ssc (10 min) | 0.3 |
| H | Au—Co bc | 0.4 |
| H | Au—Co bc | 0.6 |
| C1 | Au cc | 2.7 |
| C2 | Au cc | 2.1 |
| C3 | Au cc | 1.8 |
| C4 | Au cc | 1.5 |
| D1 | Au—Co cc | 1.5 |
| D2 | Au—Co cc | 1.4 |
| D3 | Au—Co cc | 1.1 |
| D4 | Au—Co cc | 1.2 |
| E1 | Au ssc (2 min) | 0.1 |
| E2 | Au ssc (2 min) | 0.1 |
| E3 | Au ssc (2 min) | 0.2 |
| E4 | Au ssc (2 min) | ~0 |
| I1 | Co cc | 0.5 |
| I2 | Co ssc | 0.2 |
| I3 | Co ssc | 0.3 |
| I4 | Co bc | 0.4 |

Au—Co = gold cobalt nanoparticles
Au = gold nanoparticles
Co = cobalt nanoparticles
cc = copper coupon
ssc = stainless steel coupon
bc = bronze coupon
time = time of growth of the nanoparticles on the metal substrate/support In the table above, when referring to time, such time indicates the time of growth of the nanoparticles on the metal substrate/support. When the time of growth was longer, it was observed that such nanoparticles were capable of capturing/trapping/getting more zinc, as evidenced by the increased change in mass. Without intending to be limited by theory, it is believed that such increase is due to the increase in size of the nanoparticles and/or greater deposition/surface area coverage of the nanoparticles on the metal substrate.

Figure 9A:
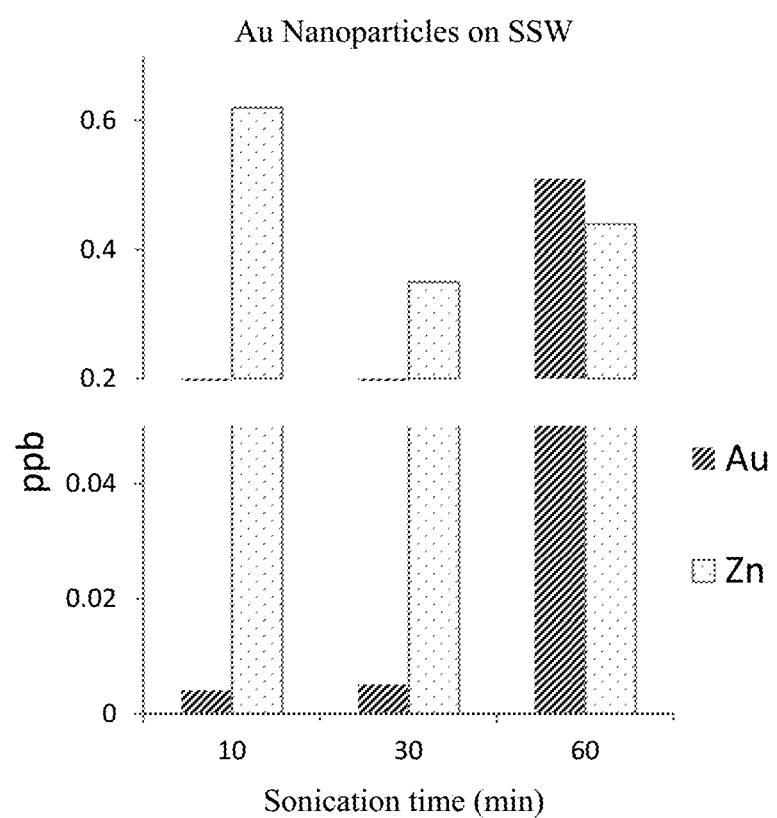
FIGS. 9a-9c provide data obtain from an ICP-MS analysis.
Figure 9B:
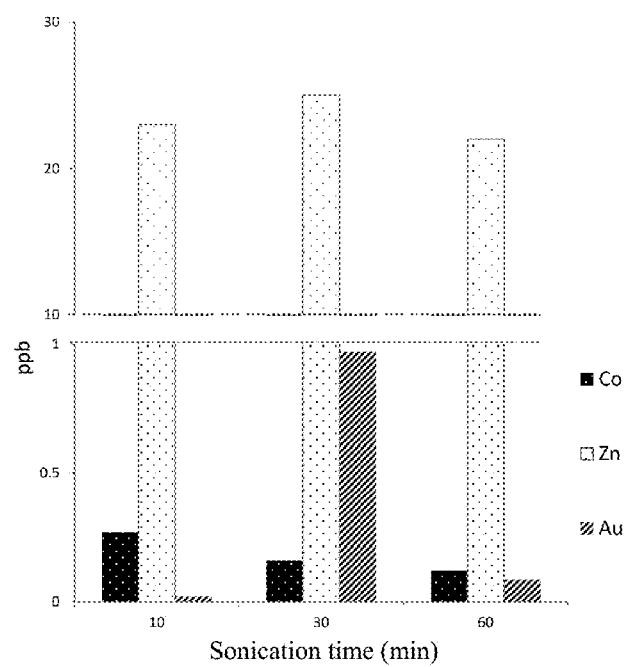
Figure 9C:
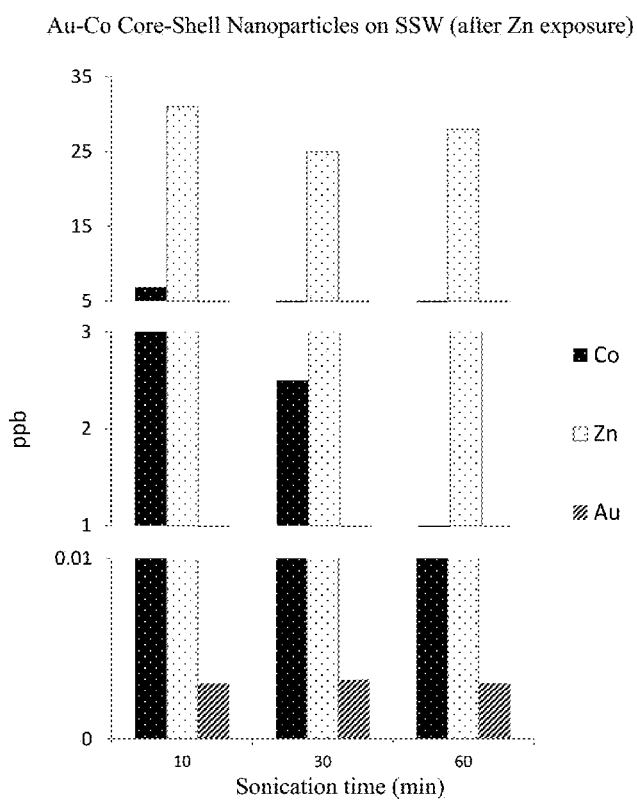

In addition, for further metal quantitation, inductively coupled plasma atomic emission spectroscopy (ICP-MS) was also performed (FIGS. 9a-9c). The data was analyzed and determined to be in agreement with the EDX analysis and showing/confirming the attachment of the nanoparticles on the substrate.

Figure 10:
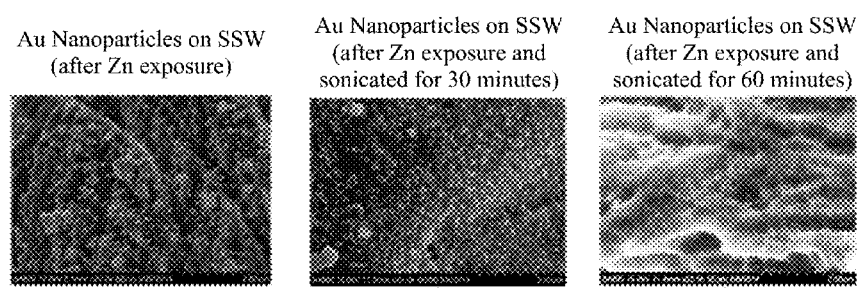
FIG. 10 provides SEM images showing the effect of sonication after zinc exposure on a stainless steel wool sample containing gold nanoparticles.

FIG. 10 provides SEM images of a material containing nanoparticles on stainless steel wool after exposure to zinc vapor and sonication in water. According to the images, the nanoparticles stayed on the substrates even after 60 minutes of sonication while the zinc was predominantly removed from the substrates after sonication.

Figure 11:
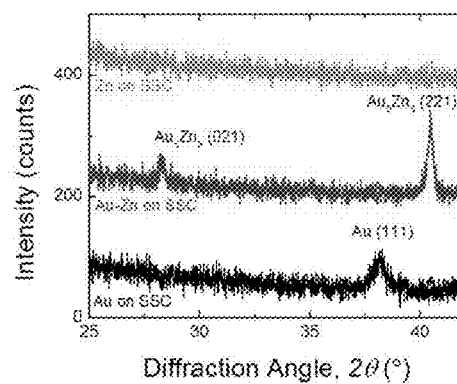
FIG. 11 provides XRD data on a material containing gold nanoparticles and stainless steel coupons after zinc vapor exposure.

X-ray powder diffraction (XRD) (FIG. 11) data was collected on materials containing gold nanoparticles on stainless steel coupons exposed to zinc vapor. The data shows that gold nanoparticles alloy with the zinc vapors and form an intermetallic compound. The alloying of the gold nanoparticles with zinc was confirmed by the disappearance of the Au(111) peak and the emergence of two $Au_5Zn_3$ diffraction peaks (021) and (221). In this regard, upon alloying, gold peaks can be observed at a diffraction angle ($2\theta$) of 21° and/or 221°. Alloying can be indicative of the material's stability and gettering capability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of capturing or trapping zinc, the method comprising
   contacting a zinc vapor with a zinc getter material comprising nanoparticles and a metal substrate.

2. The method according to claim 1, wherein the zinc vapor comprises a zinc radioisotope.

3. The method according to claim 1, wherein the zinc vapor comprises zinc-65.

4. The method according to claim 1, wherein the nanoparticles comprise cobalt, gold, or a combination thereof.

5. The method according to claim 1, wherein the nanoparticles comprise cobalt and gold.

6. The method according to claim 1, wherein the nanoparticles have a core-shell configuration.

7. The method according to claim 1, wherein the nanoparticles comprise a metal alloy.

8. The method according to claim 1, wherein the metal substrate comprises copper, tin, chromium, or a combination thereof.

9. The method according to claim 1, wherein the metal substrate comprises copper, a bronze, or a stainless steel.

10. The method according to claim 1, wherein the nanoparticles form discrete particles on the metal substrate.

11. The method according to claim 1, wherein the nanoparticles cover from 5% to 90% of the surface area of the metal substrate.

12. The method according to claim 1, wherein before the contacting step, the nanoparticles have an average particle size of from 5 nm to 500 nm.

13. The method according to claim 1, wherein before the contacting step, the nanoparticles having a multimodal size distribution.

14. The method according to claim 13, wherein the nanoparticles have a first size distribution having an average size of from 2 nm to 50 nm and a second size distribution having an average size of from greater than 50 nm to 150 nm.

15. The method according to claim 1, wherein after the contacting step, the nanoparticles have a multimodal size distribution.

16. The method according to claim 15, wherein the nanoparticles have a first size distribution having an average size of from 2 nm to 75 nm and a second size distribution having an average size of from greater than 50 nm to 175 nm.

17. The method according to claim 14, wherein after the contacting step, the nanoparticles of the first size distribution increase in size by from 5% to 100%.

18. The method according to claim 1, wherein after the contacting step, at least some of the nanoparticles containing zinc have a size of from 250 nm to 700 nm.

19. The method according to claim 1, wherein the nanoparticles comprise gold and wherein after the contacting step, the weight ratio of zinc to gold is from 0.01 to 5.

20. The method according to claim 1, wherein the nanoparticles comprise cobalt and wherein after the contacting step, the weight ratio of zinc to cobalt is from 0.5 to 80.

21. The method according to claim 1, wherein after the contacting step, an X-ray diffraction pattern indicates Au peaks at a diffraction angle ($2\theta$) of 21° and 221°.

22. The method according to claim 1, wherein the nanoparticles are formed by nucleation on the metal substrate.

23. The method according to claim 1, wherein the zinc vapor is extracted from a tritium-producing burnable absorber rod.

* * * * *

UNITED STATES PATENT AND TRADEMARK OFFICE
CERTIFICATE OF CORRECTION

PATENT NO. : 9,700,829 B1
APPLICATION NO. : 15/056699
DATED : July 11, 2017
INVENTOR(S) : Simona E. Hunyadi Murph and Paul S. Korinko It is certified that error appears in the above-identified patent and that said Letters Patent is hereby corrected as shown below:

In the Specification

Federal Research Statement (Column 1, Line 7):
"DE-AC09-085R22470"
Should read:
"DE-AC09-08SR22470"

Signed and Sealed this
Twenty-sixth Day of June, 2018

Andrei Iancu
*Director of the United States Patent and Trademark Office*